United States Patent
Hsu et al.

(10) Patent No.: US 9,501,638 B2
(45) Date of Patent: Nov. 22, 2016

(54) TECHNIQUES FOR MANAGING SECURITY MODES APPLIED TO APPLICATION PROGRAM EXECUTION

(71) Applicant: GLOBALFOUNDRIES INC, Grand Cayman (KY)

(72) Inventors: Ming-Fa Hsu, Taipei (TW); Chen-Yu Kuo, Taipei (TW); Hariharan Mahadevan, Taipei (TW); Ying-Hung Yu, Taipei (TW)

(73) Assignee: GLOBALFOUNDRIES INC, Grand Cayman (KY)

( * ) Notice: Subject to any disclaimer, the term of this patent is extended or adjusted under 35 U.S.C. 154(b) by 41 days.

(21) Appl. No.: 14/529,338

(22) Filed: Oct. 31, 2014

(65) Prior Publication Data

US 2015/0121538 A1    Apr. 30, 2015

(30) Foreign Application Priority Data

Oct. 31, 2013  (TW) ............................. 102139647 A

(51) Int. Cl.
  *H04L 29/06* (2006.01)
  *G06F 21/53* (2013.01)
  *G06F 21/62* (2013.01)

(52) U.S. Cl.
  CPC ............ *G06F 21/53* (2013.01); *G06F 21/629* (2013.01); *G06F 21/6218* (2013.01)

(58) Field of Classification Search
  CPC ... G06F 21/53; G06F 21/6218; G06F 21/629
  See application file for complete search history.

(56) References Cited

U.S. PATENT DOCUMENTS

| 7,174,452 | B2 * | 2/2007 | Carr .................. H04L 29/06027 380/255 |
| 7,779,472 | B1 * | 8/2010 | Lou ....................... G06F 21/566 726/22 |
| 8,032,935 | B2 * | 10/2011 | Winje ................... G06F 21/604 726/16 |
| 8,095,786 | B1 | 1/2012 | Kshirsagar et al. |
| 8,196,131 | B1 * | 6/2012 | von Behren ......... G06Q 20/367 705/64 |
| 2012/0255011 | A1 * | 10/2012 | Sallam .................. G06F 21/564 726/24 |

(Continued)

FOREIGN PATENT DOCUMENTS

| EP | 2403211 A1 | 1/2012 |
| TW | 200825832 A | 6/2008 |

(Continued)

OTHER PUBLICATIONS

Erika Chin et al., "Analyzing Inter-Application Communication in Android," MobiSys '11 Proceedings of the 9th International Conference on Mobile Systems, Applications, and Services, 2011.*

(Continued)

*Primary Examiner* — Shawnchoy Rahman
(74) *Attorney, Agent, or Firm* — Scully Scott Murphy and Presser; Frank Digiglio

(57) ABSTRACT

A device includes a memory and a processor coupled to the memory. The processor is configured to execute a management program, an application program, and a first security module. The management program presents a first list associated with the first security module to a user that includes a first item that represents the application program. The application program is executed in a security mode that is governed by the first security module when the first item is selected.

20 Claims, 2 Drawing Sheets

(56) References Cited

U.S. PATENT DOCUMENTS

| | | |
|---|---|---|
| 2012/0311659 A1 | 12/2012 | Narain et al. |
| 2013/0091557 A1 | 4/2013 | Gurrapu |
| 2013/0097660 A1* | 4/2013 | Das .................. H04L 63/10 726/1 |
| 2013/0110787 A1 | 5/2013 | Garimella et al. |
| 2013/0133061 A1 | 5/2013 | Fainkichen et al. |
| 2013/0145366 A1 | 6/2013 | Newell et al. |
| 2013/0219456 A1 | 8/2013 | Sharma et al. |
| 2013/0347094 A1* | 12/2013 | Bettini ............. H04L 63/0227 726/11 |
| 2014/0032733 A1* | 1/2014 | Barton ................. H04L 41/00 709/223 |

FOREIGN PATENT DOCUMENTS

| | | |
|---|---|---|
| WO | 2012128860 A1 | 9/2012 |
| WO | 2013022849 A1 | 2/2013 |

OTHER PUBLICATIONS

Smalley, S. et al., "Security Enhanced (SE) Android: Bringing Flexible MAC to Android", NDSS Symposium 2013, 18 pages.

Gessner et al.,"Towards a User-Friendly Security-Enhancing BYOD Solution." NEC Technical Journal vol. 7 No.3/2013 URL: http://www.nec.com/en/global/techrep/journal/g12/n03/pdf/120324.pdf.

"Securing Sensitive Information in a BYOD Workplace with App Wrapping." Trending Topics in Digital Strategy, May 28, 2013 URL: http://door3.com/insights/securing-sensitive-information-byod-workplace-app-wrapping.

Dell Inc., "Bring Your Own Devices Best Practices Guide." Dec. 2, 2011. URL: http://i.dell.com/sites/doccontent/business/smb/sb360/en/Documents/good-byod-best-practices-guide.pdf.

Crook, Stacy K., "Mobile Enterprise Management 2.0: Best Practices for Secure Data Management Across Any Device.", IDC white paper published in Jan. 2013.

* cited by examiner

TECHNIQUES FOR MANAGING SECURITY MODES APPLIED TO APPLICATION PROGRAM EXECUTION

This application claims priority to Taiwanese Patent Application 102139647, entitled "MANAGEMENT OF SECURITY MODES APPLIED TO EXECUTION OF APPLICATION PROGRAMS IN A COMPUTER DEVICE," filed on Oct. 31, 2013. The disclosure of Taiwanese Patent Application 102139647 is hereby incorporated herein by reference in its entirety for all purposes.

BACKGROUND

The disclosure relates to techniques for managing security modes and, more specifically, to techniques for managing security modes applied to application program execution.

Due to the development of mobile computer devices, such as smartphones and tablets, the notion bring your own device (BYOD) has gradually become popular, encouraging workers to use their own cell phones, tablets, and the like for personal and enterprise-related purposes. BYOD enables workers to work in the same way as they are used to, speeds up adaptation, and cuts enterprise device costs. Nonetheless, with a single computer device serving personal and enterprise-related purposes concurrently, corporate data is at risk for leakage.

To prevent corporate data leakage, the prior art, for example, Apple's IOS 7 operating system provides "open in management" whereby leakage of corporate documents is prevented by controlling application programs, users' documents and attachment opening authority. In particular, "Per app VPN" of IOS 7 targets a VPN accessible to a specific application program, such that the application program gets connected to a predetermined VPN automatically as soon as the application program starts. This ensures that all the data transmitted by the application program goes through the VPN and that other data will not be transmitted through the VPN.

BRIEF SUMMARY

A device includes a memory and a processor coupled to the memory. The processor is configured to execute a management program, an application program, and a first security module. The management program presents a first list associated with the first security module to a user that includes a first item that represents the application program. The application program is executed in a security mode that is governed by the first security module when the first item is selected.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The description of the illustrative embodiments is to be read in conjunction with the accompanying drawings.

DETAILED DESCRIPTION

Figure 1:
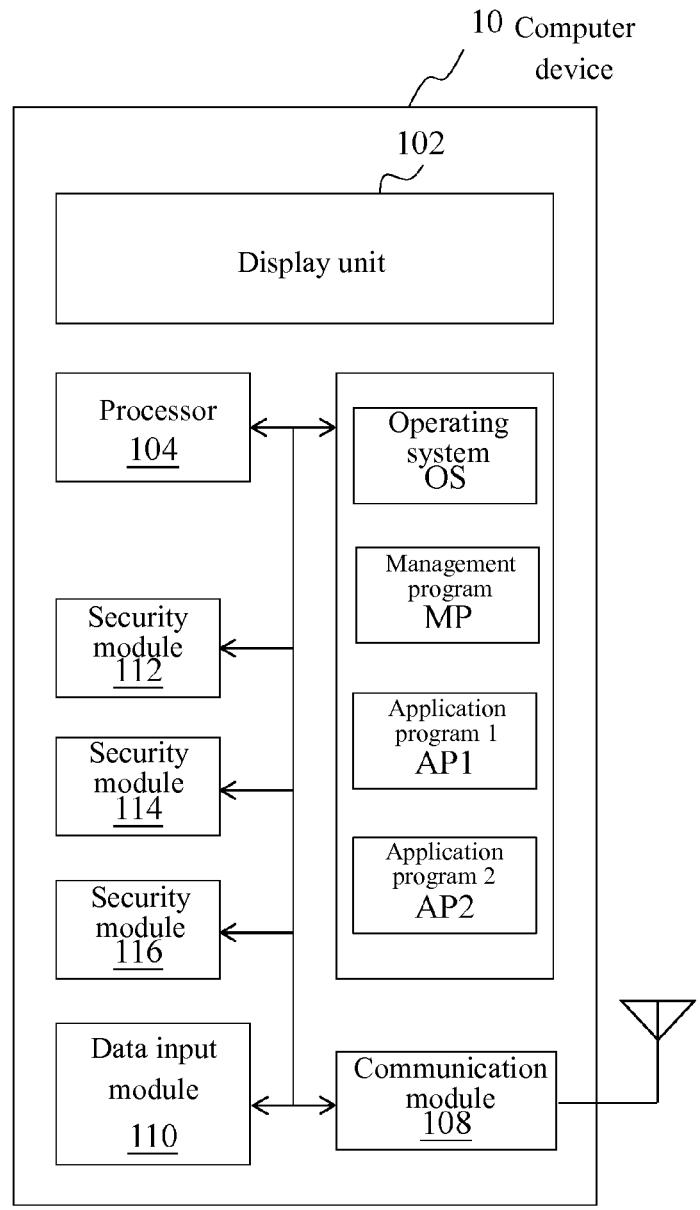
FIG. 1 shows a computer device configured according to an embodiment of the present invention.

The illustrative embodiments provide a device and a computer program product (embodied on a computer-readable storage device) that manages security modes applied to application program execution.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

It should be understood that the use of specific component, device, and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized. As may be used herein, the term 'coupled' may encompass a direct connection between components or elements or an indirect connection between components or elements utilizing one or more intervening components or elements.

As mentioned above, with bring your own device (BYOD) the same computer device serves personal and enterprise-related purposes concurrently and, as such, corporate data is at risk for leakage. For instance, since a computer device is connected to an external network and a private network and stores personal data and corporate data concurrently (and coupled with data communication between application programs), the chance of corporate data leakage is increased. Corporate data leakage may take place through data transmission to an external network, file access (including opening a file, writing data to a file, and reading data from a file), or data communication between application programs.

As one example, after opening a confidential corporate document file with his or her own apparatus a user (worker) is likely to inadvertently store the confidential corporate document file in a private file folder of his or her own apparatus and/or leave the confidential corporate document file in a buffer file folder of his or her own apparatus. As another example, although a user may want to send confidential data through a secure network, the user may get connected to an insecure network and cause data leakage through confusion, negligence, or failure to differentiate the use of application programs. In a computer device, an application program may be used in sending or receiving data pertaining to another application program. For example, not only may a simple clipboard function cause corporate data leakage to occur through text copying or a screenshot, but pipe flow between application programs can also cause important data to be sent to an application program that is not controlled.

According to the prior art, an application program may provide appropriate security configurations for processing confidential corporate data. However, it is difficult to configure each application program, as alteration of an operation purpose necessitates switching a configuration (for example, switching from office to home) and is inconvenient for a user. For example, while "Per app VPN" of IOS 7 enables VPN configuration of each application program, a user has to adjust a VPN configuration manually in different operating environments.

A disclosed embodiment provides a device (e.g., a computer device) and a computer program product that implements a management program that configures one or more lists (such as an "office" list, a "household" list, and a "public space" list) according to security modes required for different operating environments. In particular, each list may correspond to a security mode solely or be jointly governed by one or more security modules. Each list may record one or more application programs that can be executed in a given security mode. The concept "security mode" described herein refers to a single action or a "combination" of actions associated with software or hardware that is taken solely or jointly by one or more security modules for the sake of securing application program execution.

A single security module can be configured according to different security levels to provide one or more security modes that take different actions. The security modes may each include functional control of application programs (for example, prohibiting the use of a clipboard), setting forth the rules for data transmission (for example, requiring a VPN or encryption), and/or introducing an additional identity authentication mechanism (for example, requesting entering an initiation password), but the present invention is not limited thereto.

For example, as soon as an email application program (for example, Microsoft™ Outlook™) recorded on the "office" list is started, Outlook may be executed in a security mode specified on the "office" list. As one example, if the transmission of emails requires a specific VPN and the same email application program recorded on the "public space" list is started, Outlook will be executed in a security mode specified on the "public space" list, for example, if the transmission of emails requires a specific VPN and a specific encryption process (i.e., a combination of a VPN and encryption). In this case, the same application program is recorded on different lists and a user executes an application program in different security modes with different lists. In another embodiment, a user may conveniently edit application programs recorded on each list. That is, a user may edit required application programs in each security mode. For example, by dragging and dropping an icon of an application program a user may add to or remove an application program from a list.

In this manner, the same application program may be operated by a user in a simple and intuitive manner to serve personal and corporate purposes concurrently. In this case, a user is not required to pay attention to security configurations required for application programs in any given operating environment. Furthermore, each security mode may be applicable to multiple application programs, which dispenses with the need to configure application programs separately and avoids costs that would be incurred in custom-made development of application programs. Additionally, security modules of different levels can be configured according to various security needs.

FIG. 1 is a block diagram of a computer device (e.g., data processing system) 10 configured according to an embodiment of the present invention. The computer device 10 comprises a display unit 102, a processor 104, a memory 106, a communication module 108, a data input module 110, and multiple security modules 112, 114, 116. The computer device 10 may be provided in the form of a conventional notebook computer or portable information device. The computer device 10 may be, for example, a mobile phone. As one example, the mobile phone may be an Apple™ iPhone™.

The processor 104 may be, for example, a central processing unit (CPU) produced by ARM and adapted for use with a mobile device. The memory 106 may be a flash memory for storing computer-executable instructions of operating system (OS), management program (MP), and application programs AP1, AP2, such that the processor 104 accesses and executes the computer-executable instructions. For further details of a typical OS, refer to Apple's IOS 7. For further details of application programs AP1, AP2, refer to various application programs operable on iPhone. The MP creates a list (also known as Secured App Container) corresponding to each security mode solely or jointly provided by the security modules 112, 114, 116, records application programs to be executed in the security mode, and enables the user to start the application programs with the list and execute the application programs in the security mode.

The MP may correspond to a portion of the OS or be a stand-alone program. Further details of the MP and the security modules 112, 114, and/or 116 are described later. In an embodiment not shown, the computer device 10 is provided in the form of a high-level workstation, a mainframe, or the like, which features robust processing capability and storage capability, such as an IBM™ System X™, Blade Center™, or eServer™. The network described herein is provided in the form of any type of connections, including a local area network (LAN) of fixed connection, a wide area network (WAN) connection, and a dial-up connection to an Internet service provider (ISP) for Internet access, but are not limited to various wired or wireless connections. It should be appreciated that other hardware and software components (such as additional computer systems, routers, and firewalls) that are not shown may be included in a network. Although the security modules 112, 114, 116 are illustrated with embodiments described below, the present invention is not limited thereto.

The computer device 10 can include less or more security modules. Other security modules of the computer device 10 can have any function, other than the functions of the security modules 112, 114, 116. The disclosed security modules can be implemented by hardware, software, or a combination thereof. In an embodiment of a software-based security module, the security modules 112, 114, 116 can be integrated with an OS, but the present invention is not limited thereto. In an embodiment, the security module 112 is an Inter-Process Communication Broker (abbreviated as IPC Broker) module that filters inter-App communication between application programs AP1-APn. In one or more embodiments, if it is determined that the inter-App communication between application programs AP1-APn is not related to any allowable application program, the security module 112 will block the inter-App communication between application programs AP1-APn.

Examples of inter-App communication between application programs AP1-APn include: when a user selects address data in application program AP1 for saving contacts application program AP1 sends an "intent" to application program AP2 (such as Google Maps or any other map application program) for carrying out data communication, whereas the address data is sent to application program AP2; and when application program AP1 is in use, data is retrieved with a screen and a clipboard, and then the data retrieved or the data cut and pasted is copied to application program AP2. Given the conventional application program data filtering technique, the security module 112 functions as an Inter-Process Communication Broker (IPC Broker) module for filtering inter-App communication between application programs AP1, AP2.

If a transmission does not comply with an approved standard of the security module 112, the security module 112 blocks the data communication in order to prevent data leakage. In an embodiment, the user sets different security levels for the security module 112 according to different security modes. The security module 112 operates at different security levels and may take different actions in order for an application program to be executed. For instance, the security module 112 may adopt different filtering criteria for use with an application program or exercising control in different ways (for example, prohibiting the retrieval of a screen or prohibiting the sending or copying of data to any other application program). For further details on security modules refer to Erika Chin et al., "Analyzing Inter-Application Communication in Android," MobiSys '11 Proceedings of the 9th International Conference on Mobile Systems, Applications, and Services, 2011. For more information on conventional application program data filtering techniques refer to "Security Enhanced (SE) Android: Bringing Flexible MAC to Android," by Stephen Smalley and Robert Craig, NDSS Symposium 2013.

In an embodiment, the security module 114 is a network access module that functions as a network filter for filtering the traffic of a specific application program. If the filtering result indicates that the traffic content of the specific application program is allowable by the security module 114, the security module 114 directs the traffic of the specific application program to a private network, an enterprise virtual private network (VPN), or any network at a higher security level according to the configuration of the security module 114. If the filtering result indicates that the traffic content of the specific application program is not allowable by the security module 114, the security module 114 will block the traffic. In an embodiment, a user sets different security levels of the security module 114 according to different security modes as needed. The purpose of the different security levels is to enable the security module 114 to apply different filtering criteria to an application program, or enable the application program to undergo communication in different ways (for example, effectuating transmission through a specific VPN only or prohibiting the use of any wireless network that is not encrypted). For further details of the filtering and directive security network technology applicable to the security module 114, refer to the U.S. Pat. No. 8,095,786.

In an embodiment, the security module 116 is a virtual file system module that implements a file system filter for use in filtering file access instructions of an application program to determine compliance with security regulations. If it is determined that the file access instructions are sent from an application program regarded by the security module 116 as compliant with security regulations, the file access instructions (including but not limited to "open," "write," or "read") are encrypted and stored in a file created by the security module 116 and attributed to a virtual file system. If the file access instructions originate from an application program disapproved of by the security module 116, the security module 116 blocks the file access instruction and does not permit the application program to open, write data into, or read data from any file in the virtual file system.

In an embodiment, a user may set different security levels of the security module 116 according to different security modes as needed. The purpose of the different security levels is to enable the security module 116 to apply different filtering criteria to an application program, or enable the application program to use different access instructions (for example, opening a file but neither editing a file nor saving the file as a new file). For further details of a security module, refer to Linux's Virtual File System, File system in User space (abbreviated as FUSE), and the U.S. Patent Application Publication No. 2013/0110787.

Figure 2:
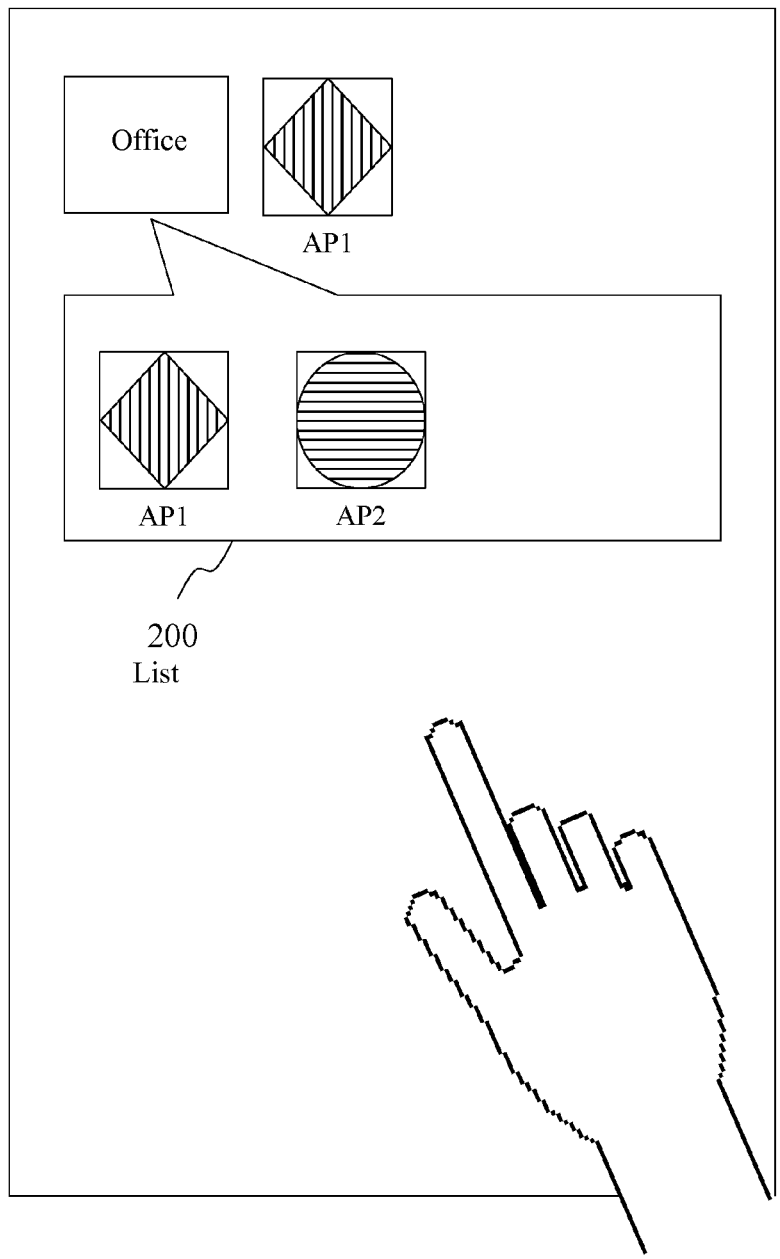
FIG. 2 shows a user interface of a computer device according to an embodiment of the present invention.

Another embodiment of the present disclosure is illustrated with respect to FIG. 2. Referring to FIG. 2, the OS of the computer device 10 provides a user interface. For further details of a user interface refer to Apple IOS 7. Although FIG. 2 is exemplified by application program AP1 and application program AP2, it should be appreciated that additional application programs may be implemented according to the present disclosure. In one embodiment, application program AP1 may take the form of free software available to the general public, such as Google+™ client software and application program AP2 may be software that is dedicated to corporate internal use.

In a typical implementation, a user determines security modes as needed. For instance, in an office environment, a user may ensure that application programs AP1, AP2 of the computer device 10 operate in a security mode (for example, prohibiting the use of any wireless network that is not encrypted) under the control of the security module 114 (shown in FIG. 1) so as to meet corporate BYOD requirements. In various embodiments, the MP is configured to create a list 200 for use in the "office" security mode, as shown in FIG. 2. A user may determine multiple different security modes as needed. The security modes are applicable to a single control action or a combination of multiple actions solely or jointly provided by the security modules 112, 114, 116. The management program MP may be configured to create a list for use in each security mode. Although FIG. 2 shows the list 200 only, it should be appreciated that more than one list may be employed.

In an embodiment, a user may freely add, delete, and edit a list as needed. To create a new list, the user edits security modes corresponding to the list by specifying security levels of one or more associated security modules and rules governing the security modules, so as to meet operation requirements. Furthermore, in the case of stricter new corporate BYOD requirements, a user can change the security modes corresponding to the list 200 to security modes applicable to the security module 114 and operable at a higher security level (for example, prohibiting any unencrypted wireless network and requiring a specific VPN) or security modes governed jointly by the security modules 112, 114 (for example, requiring a specific VPN for use in communication and prohibiting the sending or copying of data to any other application program). As shown in the diagram, the list 200 displays the icon of application program AP1 and the icon of application program AP2. If a user selects the icon of application program AP1 on the list 200 to start application program AP1, application program AP1 will be executed in a security mode governed by the security module 114, for example, effectuating the traffic of application program AP1 through a specific VPN. If the user selects the icon of application program AP1 on the list to start application program AP1, MP will access identity data of application program AP1, such as application program ID (APP ID), and thereby instruct the security module 114 to control the execution of application program AP1.

In this embodiment, as shown in FIG. 2, MP presents the list 200 graphically to the user with a graphical user interface (GUI) of an OS. In addition to the pop-up window shown in the diagram, the list 200 can be presented with a folder or a toggle menu, and the present invention is not limited thereto. By contrast, the icon of application program AP1 is disposed on a desktop (also known as home screen) provided by operating system OS. In various embodiments as soon as a user selects the icon of application program AP1 on the desktop, application program AP1 is started and thus executed in a predetermined standard way, without being controlled in any security mode. For example, if a user returns home from work but declines to conduct private communication with a family member or friend through application program AP1 in a security mode dedicated to the office, the user can start application program AP1 with its icon on the desktop instead of its icon on the list 200.

In various embodiments, a user adds to and removes items from the list 200. Referring to FIG. 2, a user may move the icon of application program AP1 or AP2 from the list 200 or onto another list or desktop. In one embodiment, a user may move an item from and onto the list 200, using an icon of application program AP1 or AP2, by drag and drop, with a GUI provided by an OS. Unlike the prior art, a user can switch application programs between different security modes. In another embodiment, since application program AP2 is software dedicated to corporate internal use, it is likely that application program AP2 can be opened through the list 200 only and executed in specific security modes but cannot be put on the desktop as is application program AP1.

According, techniques have been disclosed herein that advantageously manage security modes applied to application program execution.

The present invention may be a system, a method, and/or a computer program product. The computer program product may include a computer readable storage medium (or media) having computer readable program instructions thereon for causing a processor to carry out aspects of the present invention.

As will be appreciated by one skilled in the art, the present invention may be embodied as a computer system/device, a method or a computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A device, comprising:
    a memory storing program code; and
    a processor coupled to the memory, wherein the processor, when executing the program code, is configured to execute:
        a management program, an application program a first security module, and a second security module, wherein the first security module is a type of module selected from the group of: (a) an inter-process communication broker module, (b) a network access module, and (c) a virtual file system module, wherein the second security module is a type of module selected from the group of: (a) an inter-process communication broker module, (b) a network access module, and (c) a virtual file system module, and wherein the first security module is a type of module different from the second security module; and
        an operating system that provides a graphical user interface;
        wherein the management program is configured to present to a user, in the graphical user interface, a first list associated with the first security module, the first list including a first item that represents the application program, the application program being executed, when selected by the user from the first list, in a first security mode that is governed by the first security module; and
        wherein the management program is configured to present to the user, in the graphical user interface, a second list associated with the second security module, the second list including a second item that represents the application program, the application program being executed, when selected by the user from the second list, in a second security mode that is governed by the second security module.

2. The device of claim 1, wherein:
    when the user starts the application program by selecting the first item from the first list the management program instructs the first security module to control execution of the application program in compliance with the first security mode; and
    when the user starts the application program by selecting the second item from the second list, the management program instructs the second security module to control execution of the application program in compliance with the second security mode.

3. The device of claim 1, wherein the management program allows the user to dynamically add items to and remove items from the first list.

4. The device of claim 1, wherein the management program allows the user to dynamically add to and remove from the first list the first item.

5. The device of claim 4, wherein the user adds and removes the first item with the management program dynamically using drag and drop.

6. The device of claim 1, wherein:
    the first list is associated with a first security level of the first security module and the application program executes, when selected from the first list, in compliance with the first security level; and
    the management program is configured to present to the user, in the graphical user interface, a third list associated with a second security level of the first security module and the application program executes, when selected from the third list, in compliance with the second security level.

7. The device of claim 1, wherein the management program is configured to present to the user, in the graphical user interface, a third list associated with the first security module and the second security module, and wherein the application program, when selected by the user from the third list via selection of a third item, is executed in a security mode jointly governed by the first security module and the second security module.

8. A computer program product, comprising:
a computer-readable storage device; and
program code stored on the computer-readable storage device, wherein the program code, when executed by a data processing system, causes the data processing system to:
provide a graphical user interface;
present to a user, in the graphical user interface, a first list associated with a first security module, the first list including a first item that represents an application program, wherein the application program is executed by a management program, when selected by the user from the first list, in a first security mode that is governed by the first security module, and wherein the first security module is a type of module selected from the group of: (a) an inter-process communication broker module, (b) a network access module, and (c) a virtual file system module; and
present to the user, in the graphical user interface, a second list associated with a second security module, the second list including a second item that represents the application program, wherein the application program is executed by the management program, when selected by the user from the second list, in a second security mode that is governed by the second security module, wherein the second security module is a type of module selected from the group of: (a) an inter-process communication broker module, (b) a network access module, and (c) a virtual file system module, and wherein the first security module is a type of module different from the second security module.

9. The computer program product of claim 8, wherein:
when the user starts the application program by selecting the first item from the first list the management program instructs the first security module to control execution of the application program in compliance with the first security mode; and
when the user starts the application program by selecting the second item from the second list, the management program instructs the second security module to control execution of the application program in compliance with the second security mode.

10. The computer program product of claim 8, wherein the management program allows the user to dynamically add items to and remove items from the first list.

11. The computer program product of claim 8, wherein the management program allows the user to dynamically add to and remove from the first list the first item.

12. The computer program product of claim 11, wherein the user adds and removes the first item with the management program dynamically using drag and drop.

13. The computer program product of claim 8, wherein:
the first list is associated with a first security level of the first security module and the application program executes, when selected from the first list, in compliance with the first security level; and
the management program is configured to present to the user, in the graphical user interface, a third list associated with a second security level of the first security module and the application program executes, when selected from the third list, in compliance with the second security level.

14. The computer program product of claim 8, wherein the management program is configured to present to the user, in the graphical user interface, a third list associated with the first security module and the second security module, and wherein the application program, when selected by the user from the third list via selection of a third item, is executed in a security mode jointly governed by the first security module and the second security module.

15. The device of claim 1, wherein:
the first security module comprises at least one of software and hardware; and
the second security module comprises at least one of software and hardware.

16. The device of claim 1, wherein the inter-process communication broker module is configured to filter a communication between the application program and another application program.

17. The device of claim 1, wherein the virtual file system module is configured to filter file access instructions selected from the group including: (a) open; (b) write; and (c) read.

18. The computer program product of claim 8, wherein:
the first security module comprises at least one of software and hardware; and
the second security module comprises at least one of software and hardware.

19. The computer program product of claim 8, wherein the inter-process communication broker module is configured to filter a communication between the application program and another application program.

20. The computer program product of claim 8, wherein the virtual file system module is configured to filter file access instructions selected from the group including: (a) open; (b) write; and (c) read.

* * * * *